United States Patent

[11] 3,598,036

| [72] | Inventor | Minoru Suzuki<br>Tokyo-to, Japan |
|---|---|---|
| [21] | Appl. No. | 828,524 |
| [22] | Filed | May 28, 1969 |
| [45] | Patented | Aug. 10, 1971 |
| [73] | Assignee | Asahi Kogaku Kogyo Kabushiki Kaisha<br>Tokyo-to, Japan |
| [32] | Priority | June 12, 1968 |
| [33] | | Japan |
| [31] | | 43/40350 |

[54] DIAPHRAGM VALVE INDICATOR
1 Claim, 3 Drawing Figs.

[52] U.S. Cl. .................................................... 95/64 R, 95/10 C
[51] Int. Cl. .................................................... G03b 17/20
[50] Field of Search .......................................... 95/10 C, 64

[56] References Cited
UNITED STATES PATENTS

| 3,427,946 | 2/1969 | Broschke | 95/10 C |
| 3,439,600 | 4/1969 | Suzuki | 95/64 |
| 3,461,783 | 8/1969 | Fujii | 95/10 C |
| 3,485,153 | 12/1969 | Ono et al. | 95/10 C |

FOREIGN PATENTS

| 1,370,265 | 9/1963 | France | 95/10 C |
| 1,460,164 | 11/1965 | France | 95/10 C |

Primary Examiner—Samuel S. Matthews
Assistant Examiner—Russell E. Adams, Jr.
Attorney—Stanley Wolder ABSTRACT: A single lens reflex camera provided with interchangeable objective lenses has a diaphragm aperture indicator element and scale observed through the camera viewfinder. The indicator element is coupled to the diaphragm ring by a motion transmission wherein the rate of movement of the indicator element relative to that of the diaphragm adjustment varies in the vicinity of the fully open diaphragm to compensate for the vignetting effect. The transmission includes a string engaging the indicator and releasably connected to the diaphragm ring, and engaged by a guide mounted on a lever which is rocked by a cam in the area of the diaphragm open position.

3,598,036

INVENTOR
MINORU SUZUKI

BY Stanley Wolder
ATTORNEY 3,598,036

DIAPHRAGM VALVE INDICATOR

BACKGROUND OF THE INVENTION

The present invention relates generally to improvements in cameras and it relates particularly to an improved single lens reflex camera with interchangeable objective lenses provided with camera mounted lens opening indicating means controlled by the objective lens diaphragm control ring.

In a camera provided with an interchangeable objective, the diaphragm value indication in the viewfinder field may be accomplished in two ways. In one system, the diaphragm adjusting ring of the objective is mechanically coupled to the diaphragm indicating member in the viewfinder; while in the other system the image of the scale of the diaphragm operating ring is optically caused to appear in the viewfinder field where it may be directly read.

The present invention relates to a diaphragm value indicating arrangement wherein the diaphragm value indication is mechanically controlled. It is well known that, since in conventional interchangeable objectives the diaphragm scale is evenly angularly spaced for respective diaphragm value increments or steps, mechanical coupling can be readily effected. However, in an objective interchangeable single lens reflex camera wherein the fully open diaphragm light measurement is made with respect to light rays which have come from the object to be photographed and passed through the objective, the vignetting effect of the objective is highly significant near the fully open aperture of the diaphragm so that the angular spacing of the scale of the diaphragm control ring is nonlinear, the nonlinearity being maximum near fully open aperture region.

When interchangeable objectives of different maximum aperture, for example of $f1.4$ and $f4$, are to be attached to a camera body wherein the viewfinder is provided with a diaphragm indicating member, and when it is assumed that the diaphragm indicating member in the camera body is of $f1.4$ diaphragm scale angular spacing characteristic which is linear from $f4$ the minimum aperture, then when the $f4$ objective is employed the conventional mechanical coupled viewfinder diaphragm value indicator provides an erroneous reading because of its linear characteristic in the region near the maximum aperture of the $f4$ objective.

Accordingly, the conventional coupling between the diaphragm of an objective lens, and the diaphragm aperture value indicating mechanism which is mounted in the camera body and viewed through the finder is unsuitable for use with interchangeable objective lenses of different maximum aperture, since an error is introduced in the area of the maximum aperture of the respective objectives consequent to the vignetting effect.

SUMMARY OF THE INVENTION

It is a principal object of the present invention to provide an improved camera provided with a camera mounted mechanically coupled diaphragm aperture indicating mechanism.

Another object of the present invention is to provide a single lens reflex camera with interchangeable objectives provided with an improved diaphragm aperture indicating mechanism which is mechanically separably coupled to the objective diaphragm.

Still another object of the present invention is to provide an interchangeable objective single lens reflex camera provided with a finder viewed diaphragm aperture indicator mechanically coupled to the objective diaphragm wherein the effect of vignetting on the measurement is automatically compensated.

A further object of the present invention is to provide a diaphragm opening indicating mechanism of the above nature characterized by its accuracy, reliability, ruggedness, versatility and adaptability.

The above and other objects of the present invention will become apparent from a reading of the following description taken in conjunction with the accompanying drawings which illustrate a preferred embodiment thereof.

In a sense the present invention contemplates the provision of a camera comprising an interchangeable objective lens including a diaphragm adjustable between a fully open aperture and a minimum aperture, movable diaphragm opening indicating means mounted on said camera, and coupling means intercoupling said diaphragm and said indicating means for concurrently moving said indicating means with the adjustment of said diaphragm at relative rates which vary with said diaphragm opening. Accordingly, in an interchangeable objective single lens reflex camera which performs a fully open diaphragm light measurement, the interchangeable objective is provided with a diaphragm indication compensating member, while the camera body is also provided with a compensating coupling member which engages said compensating member upon attachment of the objective and is coupled to the viewfinder diaphragm indicating member, and a transforming member, which transforms the nonlinear diaphragm value scale spacing characteristic near fully open diaphragm aperture of the objective to linear or approximately linear characteristic, is provided at the coupling part between said engaging member and said viewfinder diaphragm indicating member, so that diaphragm value indication error due to interchangeable objectives of different maximum apertures is eliminated.

According to a preferred form of the improved mechanism a pair of rotatable rings is mounted on the camera, one of the rings carrying a cam member. A lever has a follower engageable with the cam and is provided with a line guide. A flexible line carrying an indicator element viewable through the camera finder extends from a tension spring, through the line guide to the other ring. The interchangeable lens is provided with a diaphragm ring having a pair of appropriately positioned coupling fingers which releasably engage the indicator control rings and are so related thereto that when the diaphragm aperture is proximate its maximum opening the cam engages the follower. Thus the combination of the cam motivated lever and the movement of the string control imparts greater movement to the indicator in the vicinity of maximum aperture in a predetermined manner, and thereafter upon disengagement between the follower and cam, the relationship between the diaphragm adjustment and the finder viewed indicator is substantially linear.

Thus, the present improved mechanism, provides in an interchangeable objective camera, a mechanically coupled finder viewed diaphragm aperture indicator which is accurate with different maximum aperture objectives and in which compensation of the vignetting effect on the measurement indication is accomplished.

DESCRIPTION OF THE PREFERRED EMBODIMENT

Figure 1:
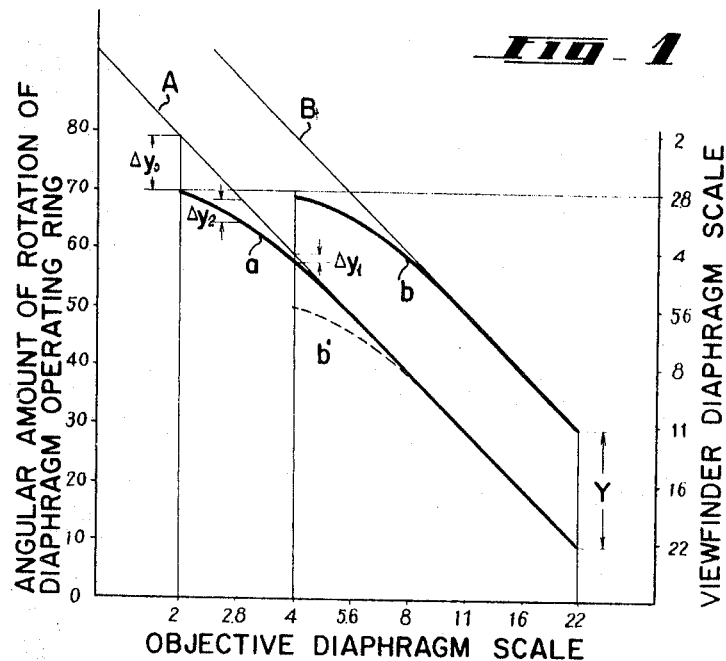
FIG. 1 is a graph indicating the relationship of the effective diaphragm aperture as related to the control ring adjustment angle of objectives of different maximum apertures and the reading error normally consequent thereto.

Referring now to the drawings and particularly FIG. 1 thereof, the heavy solid lines $a$ and $b$ indicate the diaphragm control ring scale angular spacing characteristics of $f2-22$ diaphragm aperture and $f4-22$ diaphragm aperture of respective objectives. The solid lines $a$ and $b$ are both nonlinear in the respective vicinities of the fully open diaphragm apertures. The angular displacements of both diaphragm operating rings for providing indications of the diaphragm conditions to light measurement indication operation are approximately equal at respective fully open diaphragm positions.

In view of the above it is impossible to effect a direct coupling with the viewfinder diaphragm indicating member, so that the solid line $b$ is parallelly translated until the straight line portion thereof registers with that of the solid line $a$, the resulting position of the solid line $b$ being indicated by a broken line $b'$.

This parallel translation amount is designated as diaphragm step compensation Y. When the viewfinder diaphragm indicating member coupling operation is performed with such diaphragm step compensation, indication on the objective diaphragm scale coincides with that on the viewfinder diaphragm scale in the linear range of the solid line $a$ and of the broken line $b'$, while in the nonlinear ranges, for example, with respect to the solid line $a$ the objective diaphragm scale point 2 corresponds to the viewfinder diaphragm scale point abut 2.8, and with respect to the broken line $b'$ the objective diaphragm scale point 5.6 corresponds to the viewfinder diaphragm scale point of a value between 5.6 and 8, thus providing erroneous indications.

The thin line A indicates a diaphragm-angle characteristic which corresponds to an extension of the straight line portion of the solid $a$. When the diaphragm-angle characteristic of each interchangeable objective registers with this thin line A, then the indication on the objective diaphragm scale coincides with that on the viewfinder diaphragm scale. In order to accomplish this, with respect to the solid line $a$ such compensation is made as amounts to $\Delta y_o°$ at the maximum aperture so that the nonlinear portion thereof is straightened and brought into registration with the thin line A, and in like manner compensation is so made that the broken line $b'$ is converted into a straight line in registration with the thin line A. Thus, if the diaphragm step compensation Y and nonlinear portion compensation $66y_o°$ is made with respect to each interchangeable objective when it is attached to the camera body, then the indication on the diaphragm scale of each interchangeable objective is correctly read in the viewfinder field.

Except in uncommon cases, the nonlinear characteristics of interchangeable objectives are approximately same so that the above-mentioned compensations will provide correct indications.

Figure 2:
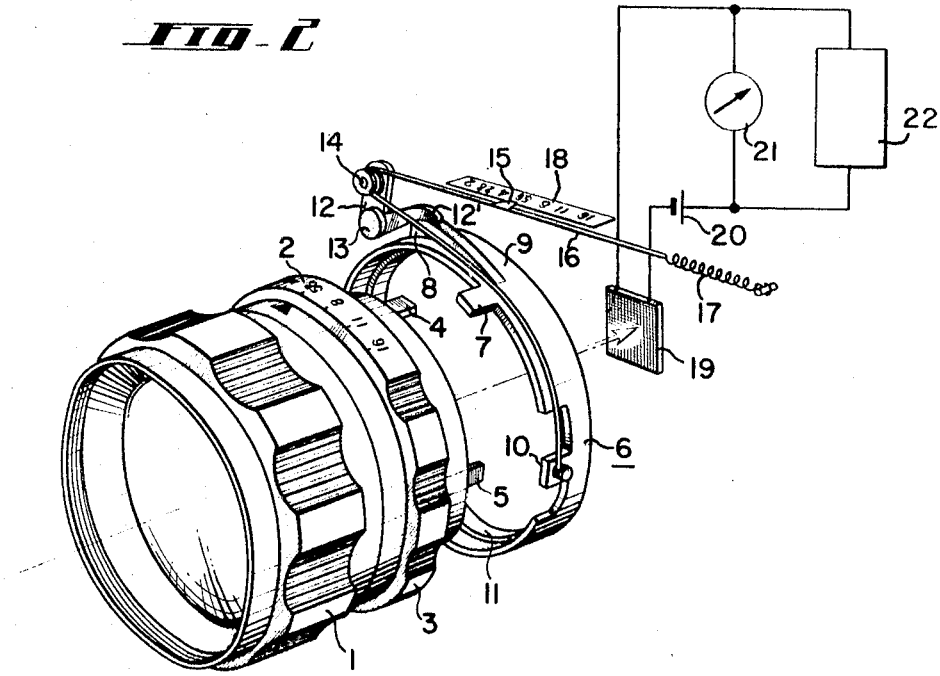
FIG. 2 is an exploded perspective view of a diaphragm aperture indicating mechanism embodying the present invention.
Figure 3:
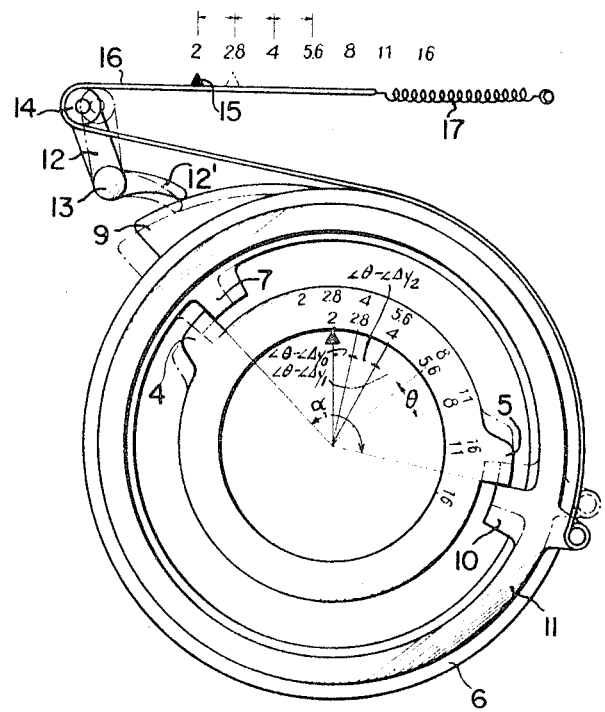
FIG. 3 is a front elevational view thereof illustrating its operation.

Description will be further given herebelow with reference to FIGS. 2 and 3.

Referring now to FIGS. 2 and 3, the camera is provided with an interchangeable objective 2 which has a diaphragm operating or control ring 3 having a nonlinear diaphragm scale 2 and a diaphragm indicating member or coupling element 4 and a diaphragm indication compensating member or coupling element 5, both connected thereto and movable therewith. A diaphragm coupled ring 6 rotatably mounted in the camera body is provided with a coupling projection 7 opposed to the diaphragm indicating member 4, a diaphragm indication coupling string groove 8 and a peripheral cam carrying nonlinear transformation section 9. Inside the diaphragm coupled ring 6 there is loosely fitted a compensation ring 11 having a compensating coupling projection 10 opposed to the diaphragm indication compensating member 5. An intermediate bellcrank level 12 is rockable about a shaft 13 secured to the camera body. One end of the intermediate lever 12 engageable with the cam on transformation section 9, while the other end portion thereof is provided with a guide roller 14. The viewfinder observed diaphragm index 15 is attached to a flexible string or line 16 which is secured at one end thereof to the compensating projection 10 and extends in the groove 8 and about the guide roller 14. The other end of the string 16 is secured to one end of a tension spring 17 whose other end is secured to the camera body. A diaphragm scale 18 is so provided as to appear in the field of the viewfinder proximate indicator 15. Further shown in the drawing are a photoelectric element 19, a battery 20, an ammeter 21 and a differential type resistance transformation device 22 for transformation of diaphragm aperture, shutter speed and ASA sensitivity value, which may be conventional and known construction.

When the objective 1 is attached to the camera body (in the present example, a clockwise rotation of predetermined angle to effect a bayonet coupling), then the diaphragm indicating member 4 and the diaphragm indication compensating member 5 are in opposed registry respectively with the projection 7 and the compensating projection 10. When the diaphragm operating ring 3 is rotated, the projections 7 and 10 are caused to move in the same direction so that the string 16 is also caused to move to effect the viewfinder diaphragm indication operation. In the vicinity of the fully open diaphragm aperture or point, that is, in the region where the diaphragm scale angular spacing is nonlinear as shown in FIG. 1, one end of the intermediate lever 12 engages the cam surface of the transformation section 9 of the diaphragm coupled ring 6 so that the intermediate lever 12 is caused to rotate.

When it is assumed that with respect to the objective of $f2-16$ as shown in FIGS. 2 and 3 the characteristic is as indicated by the solid line a of FIG. 1 where the range $f5.6-16$ is linear while the range $f5.6-2$ is nonlinear, then, in FIG. 3 within the range $f5.6$ an equal angle amount $\theta°$ is assigned to each one diaphragm increment or step, while within the range $f5.6-2$ the corresponding angle becomes smaller as the diaphragm step approaches $f2$: The step $f5.6-4$ corresponds to $\theta-\Delta y$, the step $f4-2.8$ to $\theta-\Delta y_2$ and the step $f2.8-2$ to $\theta-\Delta y_o$. The viewfinder diaphragm scale is evenly spaced, the spacing for each step being designated L.

In the even angular spacing range of the diaphragm operating ring 3, the end 12' of the intermediate lever 12 engages the circumference of a circle which is concentric with diaphragm coupled ring 6 so that the intermediate lever 12 is not moved and the string 16 performs the viewfinder scale indication. For example, if there is no transformation cam section in the nonlinear range of $f2.8-2$ the displacement of the diaphragm indicating member 15 is $\pi D$ $(\theta-\Delta y_o)/360 < L$ where $D$ is the diameter of a circle portion which is occupied by the string groove with respect to the diaphragm coupling ring 6. Thus the displacement is smaller than the one step or increment spacing L of the viewfinder diaphragm scale 18. In order to make this displacement equal to the spacing L, the action of the cam on transformation section 9 causes a predetermined rotation of the intermediate lever 12 so as to make compensation by the amount $\Delta l = L = \pi D$ $(\Lambda-\Delta y_o)/360)$, thus obtaining a correct indication. In FIG. 3 $f2-f2.8$ transformation is shown in dot-and-dash lines. The intermediate lever 12 is swung counterclockwise about the shaft 13 so that the displacement of the string 16 is increased. Although in the example the viewfinder diaphragm scale 18 is evenly spaced, if required this can be unevenly spaced.

The diaphragm step compensation Y as shown in FIG. 1 is carried out, as shown in FIG. 3, through the angle $\alpha$ between the diaphragm indicating member 4 and the diaphragm indication compensating member 5; and the angular displacement compensation as shown in FIG. 1 is, as explained above, carried out through the interaction between the transformation section 9 and the intermediate lever 12.

It should be noted that the arrangement described above may be reversed. Specifically, with each conventional interchangeable objective having an evenly spaced diaphragm scale it is possible to effect the coupled operation of the diaphragm and the exposure meter so that the light measurement indication may be brought to proper exposure, by adjusting the coupling system in accordance with the film surface brightness of the corresponding objective and the FV difference between the reference objective and the corresponding objective at the exposure meter light receiving surface with a fully open diaphragm aperture. In FIG. 3 the output signal for the exposure meter side is obtained as corresponding to the diaphragm indicating member 15. The transformation in the vicinity of fully open diaphragm is performed by so constructing and constituting the transformation section 9 as to part a negative action; and compensation of FV difference between the reference objective and the corresponding objective is carried out by the angle between the diaphragm indicating member 4 and the diaphragm indication compensating member 5.

While the example as shown in FIG. 2 and 3 relates to the diaphragm indication on the viewfinder scale, the improved arrangement can be also applied to the provision of diaphragm value signals of the exposure meter.

Thus, the advantage of the present invention is that by providing a diaphragm indication compensating arrangement and a transformation arrangement, accurate transformation of the diaphragm value indication can be readily achieved.

I claim:

1. A camera comprising an interchangeable objective lens (1) including a diaphragm control member (2) adjustable between a fully open aperture and a minimum aperture, a first rotatable member (6) mounted on said camera and including a first coupling shoulder (7), a second rotatable member (11) mounted on said camera coaxial with said rotatable member (6) and having a second coupling shoulder (10), a first coupling element (4) movable with said diaphragm member (2) and releaseably engaging said first coupling shoulder (7), a second coupling element (5) movable with said diaphragm member (2) and releaseably engaging said second coupling shoulder (10), a cam (9) mounted on said first rotatable member (6), a rockable lever (12) mounted on said camera and including a cam follower (12′) registering with the path of said cam (9), a guide member (14) mounted on said lever and movable with the rocking thereof, a flexible line (16) having one end connected to said rotatable member (11), a tension spring (17) connected between the other end of said line (16) and said camera, a scale (18) mounted on said camera, and an indicator element (15) connected to said line (16) and movable along said scale (18).